United States Patent [19]

Frushour

[11] Patent Number: 4,661,180

[45] Date of Patent: Apr. 28, 1987

[54] METHOD OF MAKING DIAMOND TOOL

[75] Inventor: Robert H. Frushour, Ann Arbor, Mich.

[73] Assignee: GTE Valeron Corporation, Troy, Mich.

[21] Appl. No.: 713,966

[22] Filed: Mar. 25, 1985

[51] Int. Cl.$^4$ ............................................. B32B 31/14
[52] U.S. Cl. ....................................... 156/89; 51/297;
51/307; 51/309; 228/121; 228/122
[58] Field of Search .................... 156/89; 51/297, 307,
51/308, 309; 228/121, 122

[56] References Cited

U.S. PATENT DOCUMENTS

| | | | |
|---|---|---|---|
| 3,192,620 | 7/1965 | Huizing et al. | 51/297 |
| 4,225,322 | 9/1980 | Knemeyer | 51/309 |
| 4,229,186 | 10/1980 | Wilson | 51/307 |
| 4,239,502 | 12/1980 | Slack et al. | 51/309 |
| 4,339,896 | 7/1982 | Dennis et al. | 51/297 |
| 4,350,215 | 9/1982 | Radtke | 228/122 |
| 4,411,672 | 10/1983 | Ishizuka | 51/307 |

*Primary Examiner*—Caleb Weston
*Attorney, Agent, or Firm*—Robert E. Walter

[57] ABSTRACT

A polycrystalline diamond disk is bonded to a substrate by forming layers of powdered diamond material and then pressing and sintering the layers to bond the diamond material and to form disks thereof. A surface of one such disk is ground or lapped flat and then placed on a substrate with a disk of a brazing alloy therebetween. The diamond disk is then brazed to the substrate at a brazing temperature of about 730° to 740° C.

2 Claims, No Drawings

METHOD OF MAKING DIAMOND TOOL

This invention concerns diamond tools. Such tools are shown in U.S. Pat. Nos. 2,173,833, 2,410,512, 2,561,709, 3,141,746, 3,334,968, 3,574,580, 3,745,623, 4,151,686, 4,229,186 and 4,231,195. As discussed therein, high temperatures and pressures are usually required to secure the diamond material to a substrate, for example, a toolholder. This invention discloses a process for securing a polycrystalline diamond mass to a substrate without the need of such high temperatures and pressures. The process involves the use of a particular brazing alloy. The composition of the brazing alloy is such that it wets the diamond material as well as the substrate. The brazing temperature is low enough to avoid thermal expansion problems in case catalytic material remains in the diamond material and to prevent oxidation problems in the case where no catalytic material remains in the diamond material, which renders the material more susceptible to oxidation.

In one example of this invention, diamond powder which had been screened through 140 mesh is poured into a refractory metal, e.g., zirconium, cup to form a thin layer, say, about 60 mils thick. A thin disk of cobalt metal, say, 5 mils thick, is placed over the diamond layer, and then another diamond layer is poured over the metal disc. This is repeated until there is, say, about ten layers of diamond powder each separated by a cobalt disk. The layers are then pressed and sintered at high temperature and pressure to bond the diamond material, as is known, for example, at 1250° C. and 45 kilobars.

The diamond layers can be separated by leaching out the cobalt with acid, say aqua regia. The diamond material, now in the form of thin disks, is ground or lapped flat on one surface to prepare it for brazing. The diamond disk is then brazed to a suitable substrate made of, for example, tungsten carbide using a silver-copper-indium brazing alloy disk about two mils thick at a brazing temperature of about 730°–740° C. One example of such a brazing alloy is Incusil 15 made by the Wesgo Division of GTE Products Corp., Belmont, CA, the composition of which is 61.5% silver, 24% copper, 14.5% indium, liquidus temperature of 705° C.

Instead of separating the diamond layers with a disk of cobalt metal, which requires leaching to separate the diamond layers after pressing and sintering, the layers may be separated by use of a disk of zirconium metal, say, about two mils thick, and a disk of mica, say, about five mils thick. The zirconium acts as an oxygen getter and the mica, which is non-reactive at the pressing and sintering conditions, permits ready separation of the diamond layers without the need of leaching.

The brazing alloy should be such as to wet the diamond material and the substrate which may comprise the usual substrates for tool holders, matrix drill bit bodies and the like, which substrates can be tungsten carbide, silicon nitride, silicon carbide, steel, etc. The brazing alloy should have a brazing temperature of about 730° to 740° C. As previously mentioned, higher temperatures than this can result in problems with the diamond material, whether or not the catalytic material has been leached out of it.

I claim:

1. The process of forming a substrate to which is bonded a polycrystalline diamond disk comprising the steps of forming layers of powdered diamond material, pressing and sintering said layers to bond the diamond material and form disks thereof, grinding or lapping flat one surface of one said diamond disks, placing said flattened surface of said disk on a substrate with a disk of brazing alloy therebetween, said brazing alloy comprises $61\frac{1}{2}$% silver, 24% copper and $14\frac{1}{2}$% indium and brazing said diamond disk to said substrate at a temperature of 730° C. to 740° C.

2. The process of claim 1 wherein the brazing alloy has a liquidus temperature of 705° C.

* * * * *